Feb. 12, 1957    R. O. ROBINSON, JR    2,781,512
CYLINDRICAL NOTCH ANTENNA
Filed Dec. 5, 1951    2 Sheets-Sheet 1

TO TRANSMITTER OR RECEIVER

INVENTOR.
RALPH O. ROBINSON, JR.
BY

Feb. 12, 1957  R. O. ROBINSON, JR  2,781,512
CYLINDRICAL NOTCH ANTENNA
Filed Dec. 5, 1951  2 Sheets-Sheet 2

INVENTOR.
RALPH O. ROBINSON, JR.
BY

United States Patent Office 2,781,512
Patented Feb. 12, 1957

2,781,512

CYLINDRICAL NOTCH ANTENNA

Ralph O. Robinson, Jr., Silver Spring, Md., assignor to the United States of America as represented by the Secretary of the Navy Application December 5, 1951, Serial No. 259,927

5 Claims. (Cl. 343—708)

The present invention relates to an antenna unit for use in the transmission or reception of radio signals, more particularly signals of relatively high frequency, and is designed to be incorporated in the structure of an existing tubular body portion, usually cylindrical or frusto-conical, of an airborne vehicle such as an airplane or a guided missile. This invention is an improvement upon that of the same inventor, forming the subject matter of application Serial No. 86,361, filed April 8, 1949.

Heretofore it has been customary to provide special housings for antennas that are to be carried by aerial vehicles, usually in the form of "streamlined" domes or blisters attached to the vehicles. This practice, however, is objectionable in that it adds to the bulk and weight of the vehicle and moreover increases the air resistance and otherwise impairs the aerodynamic characteristics of said vehicle. Other expedients currently in use comprise loops encircling the forward end of the vehicle and mounted on insulation secured to the body of the vehicle, and these have the disadvantage of adding weight to the vehicle, while also weakening it structurally.

An object of the present invention, therefore, is to provide an antenna assembly for airborne vehicles which does not impair their aerodynamic characteristics nor add weight to the vehicles.

Another object of the invention is to provide an extremely compact antenna assembly for aircraft, which moreover has excellent directional radiation characteristics.

A further object is to provide an antenna system that utilizes a part of the existing structure of the airborne vehicle as its radiating element.

A specific object is to provide an antenna system that makes use of one or more open-ended notches located in an end portion of a tubular body member of the vehicle as a feature of the antenna.

Other objects and many of the attendant advantages of this invention will be appreciated readily as the same becomes understood by reference to the following detailed description when considered in connection with the accompanying drawings, wherein.

Figure 1:
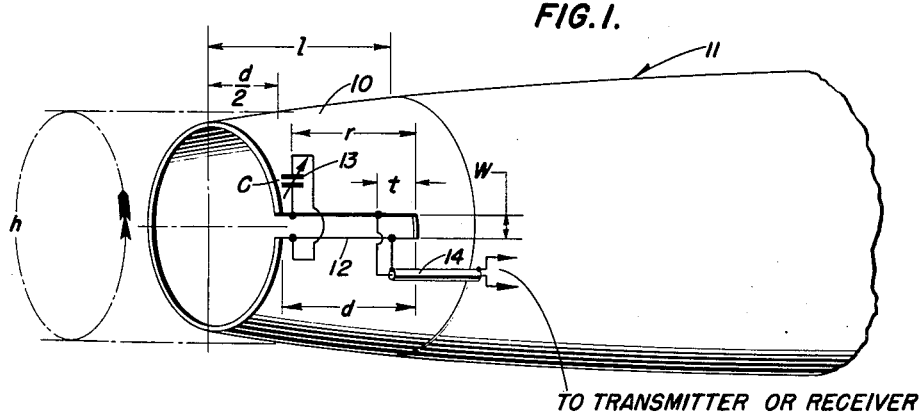
Fig. 1 is an illustration showing an end portion of an aerial vehicle with a tubular metal end section having a notch formed therein, whereby the remaining metal adjacent said notch serves as an antenna, the said metal end section having certain characteristic dimensions marked thereon.

Referring first to Fig. 1, there is shown the tubular end section 10 of an aerial vehicle 11, usually but not necessarily the forward or nose end. End section 10 is made of a conducting material such as an aluminum alloy or some other metal or alloy, but for the purpose of this invention it is unimportant what material is used for the remainder of the vehicle.

The section 10 has an edge formed with a recess extending from said edge into the section. The recess has an open end at the edge and the end remote from said open end is conductively terminated within the section to define a notch 12. While the notch is shown as having parallel sides and a straight end, these are not essential characteristics and a wide range of variation of shape of the notch is permissible. However, the parallel-sided notch lends itself much more readily to design and computation. If desired, the notch may be filled with a suitable solid dielectric material, to provide an unbroken surface on the vehicle, so that its aerodynamic properties may not be impaired.

In order to tune the notch structure to a desired frequency within a suitable range, a preferably variable capacitor 13 has its terminals connected to the metal of the nose section 10 on opposite sides of the notch. Frequently the optimum location of these connections is near the forward end of the notch, as shown in Fig. 1, although not invariable rule applies, and obviously in practice the connections will be made where the best results are secured, as determined by experiment.

A transmission line 14 is also connected to the nose section 10 as indicated, usually near the closed end of the notch, the optimum location likewise being best found by trial. This transmission line, which may be a coaxial cable or a waveguide, leads to either a transmitter or a receiver as suits any given case, the notch antenna being equally suitable for transmission and reception of radio frequency signals.

The characteristic dimensions of the above-described notch antenna are set forth by the letters $d$, $h$, $l$, $r$, $t$ and $w$ which are explained below. The circumference of the notched tapered or frusto-conical end section 10, measured at the center line of the length of the notch is designated by $h$ and the length of the end section by $l$. The width of the notch is $w$ and its length is $d$. Ordinarily it is desirable that the length $d$ of the notch be less than a quarter wave length of the radiation being transmitted or received, and while this condition holds the inductive reactance of the notch decreases as its length $d$ decreases. Hence, to allow for notch lengths less than a quarter wave length, as well as to provide greater flexibility of choice of operating conditions, a tuning capacitor 13 of capacitance $c$ may be connected across the notch near its open end, as shown. Thereby successful operation is possible with notch dimension $d$ even as short as one-sixtieth of a wave length. The tuning capacitance $c$ may be connected at a distance $r$ from the closed end of the notch and the transmission line at the distance $t$ from said end. There is no difficulty in matching the usual transmission line to the notch antenna, provided the dimensions of the notch are of the proper order of magnitude for the frequency of the oscillations being transmitted.

In one specific embodiment of the invention, a circular leading edge band having a notch one-sixteenth inch wide and three inches long, and excited by a 220 megacycle source of radio frequency energy, applied to said band through a coaxial transmission line connected one-fourth inch from the inner closed end of the notch, provided substantial radiation in a vertical plane, at the said frequency.

Figure 2:
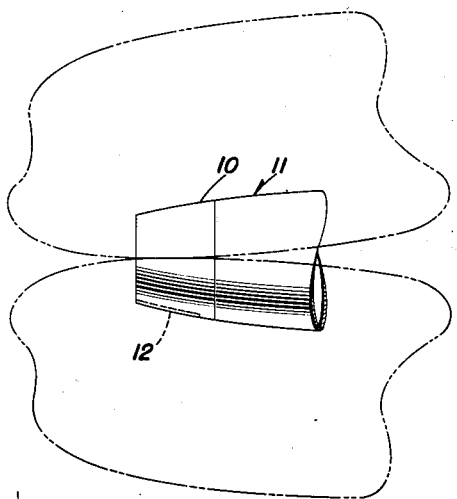
Fig. 2 is a top view of the metal end section and a radiation pattern showing the type of energy distribution in a horizontal plane corresponding to the notch antenna when located as shown in Fig. 1.
Figure 3:
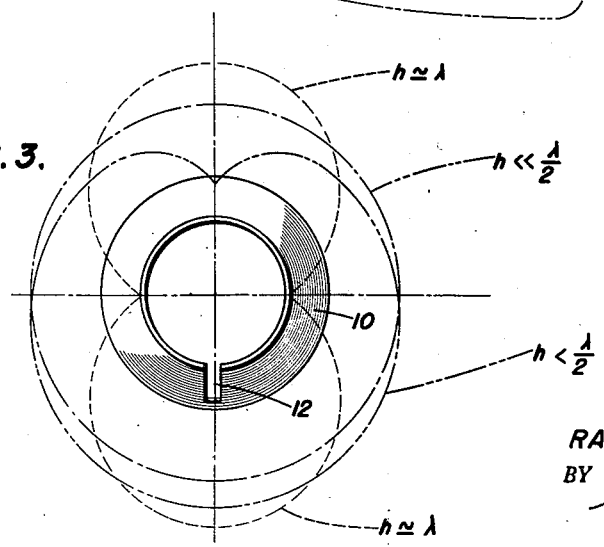
Fig. 3 is a front elevation of the metal end section with a set of the corresponding radiation patterns due to said notch but in a vertical plane transverse to the vehicle axis.

The pattern of radiation from a tubular notch antenna, which is determined by the frequency, the length $l$, and the mean circumference $h$ of the notched portion of the leading edge band 10, is illustrated in Figs. 2 and 3. When the circumference $h$ is considerably shorter than one-half wave length of the oscillations, a radiation pattern similar to that of a loop antenna is produced, with the exception that certain trailing fringe lobes are present, due to conduction in that part of the nose section which is adjacent the leading edge.

For other relative values of $h$ and the wave length $\lambda$, the radiation pattern in the vertical plane varies somewhat as indicated in Fig. 3, wherein are illustrated the types of pattern corresponding to values of $h$ considerably less than one-half wave length, slightly less than one-half wave length, and nearly equal to one wave length respectively. These patterns, in the order mentioned, are approximately a circle, a cardioid, and two circles forming a figure-eight pattern, as shown in said Fig. 3.

As the notch 12, Fig. 1 does not extend throughout the entire length of the end section 10, said section still retains considerable mechanical strength, which would be entirely lost in an end section that is split from end to end. Aside from this advantage, another important feature of the invention is that by proper selection of existing structures in the aerial vehicle, it is usually possible to secure a desired radiation pattern without modifying any structural features except for cutting a notch, thus adapting a portion of the vehicle to serve as an antenna without making substantial changes. It will, of course, be understood that while the invention has been disclosed primarily as embodied in a transmission antenna, it is equally suitable for receiving purposes.

Figure 4:
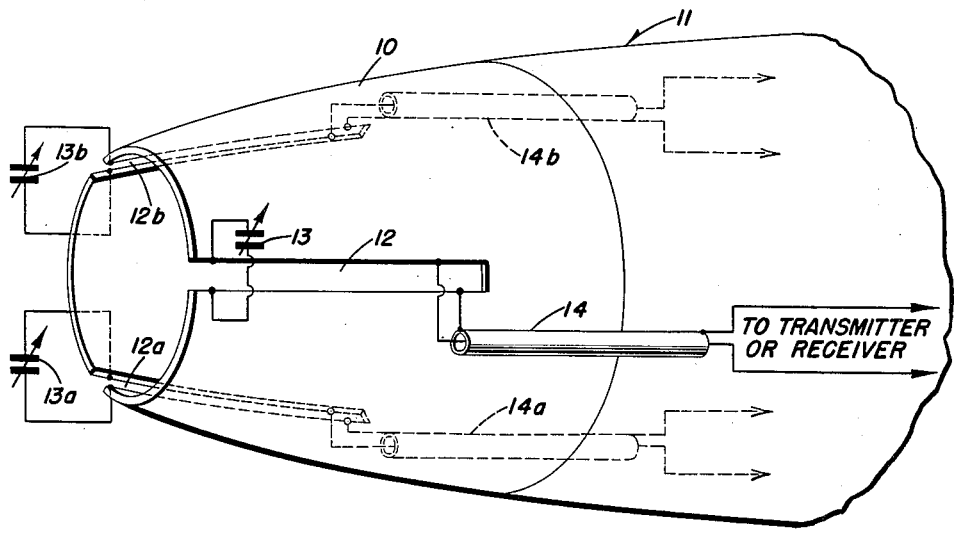
Fig. 4 shows a modified form of the invention, wherein several notches are provided.

Referring now to Fig. 4, there are shown three notches 12, 12a and 12b which are located symmetrically around the section 10, that is, they are spaced 120° apart around the outer end of said section.

These notches may be excited separately by the energy delivered to them through the transmission lines 14, 14a and 14b respectively and each will preferably have its own tuning capacitor, 13, 13a and 13b respectively, as shown. It is also possible, if preferred, to omit transmission lines 14a and 14b, in which case the notches corresponding thereto will nevertheless be excited parasitically, especially if the wave length is such that standing waves of proper location are set up, to cause resonance response of said unconnected notches.

Figure 5:
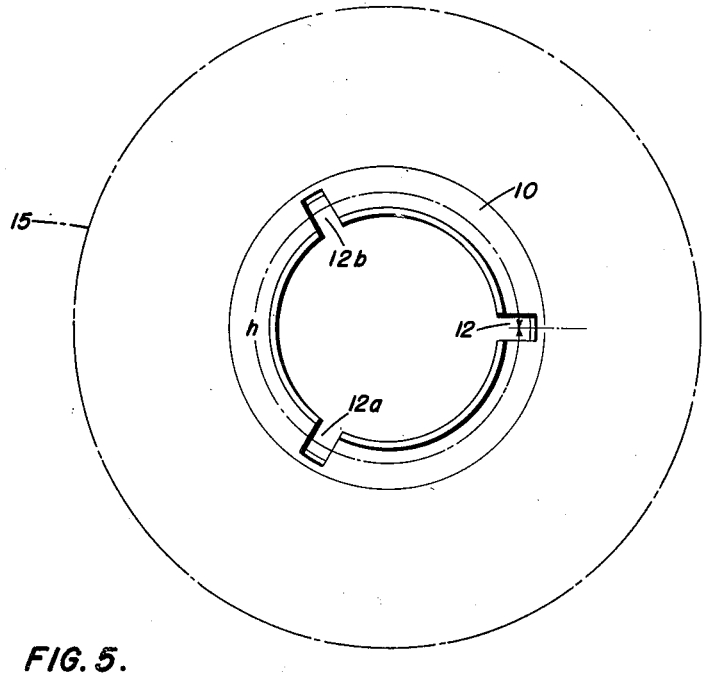
Fig. 5 is a front elevation of the triply-notched metal end section and shows also one of a large number of radiation patterns which may be obtained by said modified form.

When the three notches are symmetrically located and are all excited either directly or parasitically, a circularly polarized radiation pattern such as is shown at 15 in Fig. 5 will be set up, and in this case the transmission will be omnidirectional. While transmission has been discussed specifically, it will be clear that the antenna system of Figs. 4 and 5 will equally well be suitable for use in reception.

It will also be understood that only a single case has been discussed, wherein symmetrical arrangement and excitation of the notches are provided. Variation of the number and arrangement of the notches and in the wavelength obviously will yield an infinite variety of radiation patterns, and hence the present invention is not to be considered as limited to the specific number and arrangement of notches illustrated nor to any particular wavelength.

Obviously many modifications and variations of the present invention are possible in the light of the above teachings. It is therefore to be understood that within the scope of the appended claims, the invention may be practiced otherwise than as specifically described.

What is claimed is:

1. In an antenna, a tubular section of electrically conducting material having an edge formed with a plurality of symmetrically arranged recesses each having an open outer end communicating with the edge, the end remote from said open end of each said recess being conductively terminated by the section thereby to form a notch, a capacitor for tuning each notch, each of said capacitors being connected between opposed walls of its associated notch, and transmission lines for simultaneously conducting electromagnetic energy to said notches, each of said transmission lines having terminals connected to opposed walls of its associated notch, said notches providing impedance matching between the transmission lines and the edge of the tubular section.

2. In combination with an aerial vehicle having a cylindrical body terminating in a tubular end section of electrically conducting material terminating in an edge, an antenna system for the vehicle and forming a part thereof, comprising a recess open at the edge and extending from said edge into the section, the end remote from said open end of said recess being conductively terminated by said section thereby to form a notch, and means connected to opposite points on the sides of said notch feeding electro-magnetic energy to said notch, thereby causing said section to radiate.

3. In combination with an aerial vehicle having a cylindrical body terminating in a tubular end section of electrically conducting material terminating in an edge, an antenna system for the vehicle and forming an integral part of said vehicle, comprising a recess open at the edge and extending from said edge into the section, the end remote from said open end of said recess being conductively terminated by said section thereby to form a notch, tuning means connected to opposite sides of said notch, and means connected to the opposite sides of said notch for feeding electro-magnetic energy to said section, thereby causing said section to radiate.

4. In combination with an aerial vehicle having a cylindrical body terminating in a tubular end section of electrically conducting material terminating in an edge, an antenna system for the vehicle and forming an integral part of said vehicle, comprising a recess open at the edge and extending from said edge into the section, the end remote from said open end of said recess being conductively terminated by said section thereby to form a notch, tuning means connected to the opposite sides of said notch, and a transmission line having terminals connected to the opposite sides of said notch for feeding electro-magnetic energy to the section for causing said section to radiate, the connection between the tubular end section and the tuning means being made at a point remote from the connection between the tubular end section and the transmission line.

5. In combination with an aerial vehicle having a cylindrical body terminating in a substantially frusto-conical tubular end section of electrically conducting material terminating in an edge, an antenna system for the vehicle and forming an integral part of said vehicle, said system comprising a recess extending from said edge into said section, said recess having an open end at the edge, the end remote from said open end of said recess being conductively terminated by said section thereby to form a notch, tuning means connected to the opposite sides of said notch near said edge, and means also connected to the opposite sides of said notch for feeding electro-magnetic energy into the notch, thereby causing the section to radiate.

References Cited in the file of this patent

UNITED STATES PATENTS

| 2,129,852 | Leib | Sept. 13, 1938 |
| 2,250,096 | Engbert | July 22, 1941 |
| 2,276,297 | Kroger | Mar. 17, 1942 |
| 2,414,266 | Lindenblad | Jan. 14, 1947 |
| 2,452,822 | Wolf | Nov. 2, 1948 |
| 2,507,528 | Kandoian | May 16, 1950 |

(Other references on following page)

UNITED STATES PATENTS

| | | |
|---|---|---|
| 2,543,130 | Robertson | Feb. 27, 1951 |
| 2,559,693 | Willoughby | July 10, 1951 |
| 2,567,220 | Litchford | Sept. 11, 1951 |
| 2,574,433 | Clapp | Nov. 6, 1951 |
| 2,586,895 | Willoughby | Feb. 26, 1952 |
| 2,600,179 | Alford | June 10, 1952 |
| 2,604,594 | White | July 22, 1952 |
| 2,652,492 | Shanklin | Sept. 15, 1953 |
| 2,659,002 | Keeler | Nov. 10, 1953 |

FOREIGN PATENTS

| | | |
|---|---|---|
| 643,557 | Great Britain | Sept. 20, 1950 |
| 649,775 | Great Britain | Jan. 31, 1951 |

OTHER REFERENCES

Bailey: Slot Feeders and Slot Aerials, "Journal of Institution of Electrical Engineers," vol. 93, part III A, No. 4, May 1946.

Rhodes: Slot Antenna Developments, "Radio and TV News, Radio Electronic Engineering Section," May 1951.

Lindenblad: Slot Antennas, reprinted from "Proc. I. R. E." vol. 35, No. 12, December 1947.